J. A. GLENN.

Horse Hay-Fork.

No. 84,544.

Patented Dec. 1, 1868.

Witnesses

Inventor

J. A. GLENN, OF WEST MIDDLESEX, PENNSYLVANIA.

Letters Patent No. 84,544, dated December 1, 1868.

IMPROVEMENT IN HORSE HAY-FORKS.

The Schedule referred to in these Letters Patent and making part of the same.

*To all whom it may concern:*

Be it known that I, J. A. GLENN, of West Middlesex, in the county of Mercer, and in the State of Pennsylvania, have invented certain new and useful Improvements in "Horse Hay-Forks;" and do hereby declare that the following is a full, clear, and exact description thereof, reference being had to the accompanying drawings, and to the letters of reference marked thereon.

The nature of my invention consists in the construction and general arrangement of a horse hay-fork which will be hereinafter more fully set forth.

In order to enable others skilled in the art to which my invention appertains, to make and use the same, I will now proceed to describe its construction and operation, referring to the annexed drawings, which form a part of this specification, and in which—

Figure 1:
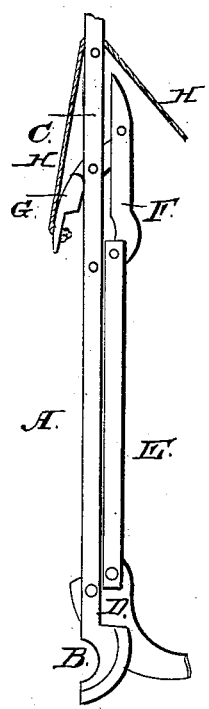

Figure 1 is a side view, showing one side of the hay-fork, and

Figure 2:
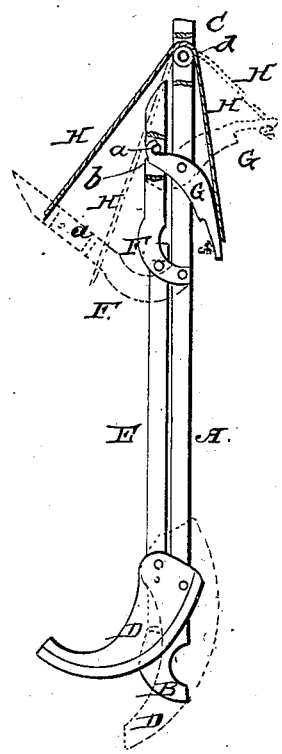

Figure 2, a side view showing the other side.

A represents a straight bar, which at its lower end forms a hook, B, and at its upper, the handle C, to which latter the rope for hoisting the fork up is attached.

Near the lower end of the bar A the large cutter D is pivoted, said cutter being also pivoted to a side bar, E, which runs parallel with the bar A, and is of suitable length.

At the upper end the side bar E is pivoted to a curved bar, F, the end of this curved bar being pivoted to the straight bar A.

The upper end of the curved bar F is slotted, and in this slot is a pin, *a*, the use of which will be hereinafter set forth.

It will readily be seen that by turning the curved bar F downwards, the side bar E will extend the large cutter D, and when said curved bar F is turned up, the cutter D is raised on one side, holding the hay up. The large cutter D, as well as the hook B, is bevelled on the outside along the inner edges, as plainly shown in the drawings, thus enabling me to use the machine as a hay-knife.

The draught is on the straight bar, which is formed with a hook at its lower end, and not on the bar which operates the large cutter, by which arrangement the hay will more readily pass off the fork when it is tripped.

At a suitable point on the straight bar A, below the handle C, is pivoted a lever, G, which at one end forms a hook, *b*. This hook, when the fork is ready to be raised, catches on the pin *a*, in the curved bar F, and holds it up, at the same time keeping the large cutter D in position, extended to one side, and preventing the hay from falling off.

A trip-rope, H, is attached to the other end of the lever G, and passed over a pulley, *d*, in the handle C, and thence through the same slot in the curved bar F in which the pin *a* is situated. By pulling on this rope the hook *b* is released from the pin *a*, and the weight of the hay brings the large cutter D down, allowing the hay to pass off with ease.

By the arrangement of the trip-rope passing over the pulley *d*, and through the slot in the curved bar F, it will be impossible for the fork to trip before the rope is pulled, and if the fork, as it passes over the beam into the mow, should turn around, which is often the case, the fork can be as easily tripped as if it were in its original position.

Having thus fully described my invention,

What I claim as new, and desire to secure by Letters Patent, is—

1. The arrangement of the elongated draught-bar A and its hook B, bar E and hook D, with lever G, bar F and rope H, all constructed and operating as herein shown and described.

2. The arrangement of the lever G, rope H, handle C, pulley *d*, and slotted and curved bar F, all substantially as herein set forth.

In testimony that I claim the foregoing, I have hereunto set my hand, this 26th day of September, 1868.

J. A. GLENN.

Witnesses:
M. S. PRICE,
R. P. PERRY.